United States Patent
Bennett et al.

(10) Patent No.: US 10,430,400 B1
(45) Date of Patent: Oct. 1, 2019

(54) USER CONTROLLED FILE SYNCHRONIZATION LIMITS

(71) Applicant: IONU SECURITY, INC., Longmont, CO (US)

(72) Inventors: David W. Bennett, Longmont, CO (US); Paul Franklin Vernon, II, Longmont, CO (US); Timothy E. Beres, Boulder, CO (US)

(73) Assignee: IOnU Security, Inc., Longmont, CO (US)

( * ) Notice: Subject to any disclaimer, the term of this patent is extended or adjusted under 35 U.S.C. 154(b) by 805 days.

(21) Appl. No.: 14/716,432

(22) Filed: May 19, 2015

(51) Int. Cl.
*G06F 16/00* (2019.01)
*G06F 16/23* (2019.01)
*G06F 16/27* (2019.01)
*G06F 16/951* (2019.01)

(52) U.S. Cl.
CPC ........ *G06F 16/2322* (2019.01); *G06F 16/275* (2019.01); *G06F 16/951* (2019.01); *G06F 2201/80* (2013.01)

(58) Field of Classification Search
CPC .................. G06F 17/30353; G06F 16/2322
USPC ......................................... 707/610; 711/162
See application file for complete search history.

(56) References Cited

U.S. PATENT DOCUMENTS

| | | | | |
|---|---|---|---|---|
| 7,657,718 | B1 * | 2/2010 | LeCrone | G06F 11/2076 707/812 |
| 2006/0053261 | A1 * | 3/2006 | Prahlad | G06F 3/0605 711/162 |
| 2007/0186068 | A1 * | 8/2007 | Agrawal | G06F 11/1456 711/162 |
| 2011/0238621 | A1 * | 9/2011 | Agrawal | G06F 16/273 707/610 |

* cited by examiner

*Primary Examiner* — Chelcie L Daye
(74) *Attorney, Agent, or Firm* — Crawford Maunu PLLC

(57) ABSTRACT

Approaches for synchronizing data files across multiple systems are described. A user-specified value of a threshold indicative of a quantity of data is input to a computer processor and stored in processor-readable memory on one of the systems. A set of files of the replicated files that are unsynchronized between the one system and another system of the systems is determined, along with a quantity of data to be synchronized for the set of files. The files in the set of files are synchronized between the one system and the other system in response to the quantity of data to be synchronized satisfying the value of the threshold. Fewer than all of the set of files are synchronized in response to the quantity of data to be synchronized not satisfying the threshold.

19 Claims, 6 Drawing Sheets

USER CONTROLLED FILE SYNCHRONIZATION LIMITS

FIELD OF THE INVENTION

The disclosure generally relates to synchronizing files across multiple systems.

BACKGROUND

Cloud storage services are popular with many users because the users may have access to a vast amount of storage space for data while reducing their efforts in having to manage the physical resources behind the storage. Cloud storage services may also provide a degree of portability. Through a synchronization mechanism provided by the cloud storage service, a user may access the same file or set of files on multiple devices. For example, the same file may be accessed on desktop workstations, laptop computers, tablets or smartphones.

SUMMARY

In one embodiment, a method of synchronizing replicated files across a plurality of systems includes inputting a user-specified value of a threshold indicative of a quantity of data to a computer processor and storing the value of the threshold in processor-readable memory on one of the systems. The method determines a set of files of the replicated files that are unsynchronized between the one system and another system of the systems and determines a quantity of data to be synchronized for the set of files. The files in the set of files are synchronized between the one system and the other system in response to the quantity of data to be synchronized satisfying the value of the threshold. Fewer than all of the set of files are synchronized in response to the quantity of data to be synchronized not satisfying the threshold.

In another embodiment, a method of synchronizing replicated files across a plurality of systems includes soliciting from a user a value of a threshold at one of the systems and inputting the value of the threshold in response to user specification of the value. The value of the threshold, which indicates an amount of space available on the one system for storage of the replicated files, is stored in processor-readable memory on the one system. The method determines a first set of files of the replicated files that are unsynchronized and a second set of files of the replicated files that are synchronized between the one system and another system of the plurality of systems. First and second quantities of data of the first and second sets of files are determined, respectively. In response to a sum of the first and second quantities of data being greater than the threshold value, the method selects on the one system one or more files of the second set having a quantity of data that is greater than or equal to the first quantity of data. Storage on the one system is de-allocated from the one or more files, and the first set of files is synchronized between the one system and the other system.

A system for synchronization of replicated files is provided in another embodiment. The system includes a memory arrangement configured with a plurality of files that are replicated on another system. A computer processor is coupled to the memory arrangement and is configured with instructions that when executed by the computer processor cause the computer processor to input a user-specified value of a threshold indicative of a quantity of data and store the value of the threshold in the memory arrangement. The system is configured to determine a set of files of the replicated files that are unsynchronized between the memory arrangement and the other system and determine a quantity of data to be synchronized for the set of files. The processor is configured to synchronize all the files of the set of files between the memory arrangement and the other system in response to the quantity of data to be synchronized satisfying the value of the threshold. The processor is configured to synchronize fewer than all of the set of files between the memory arrangement and the other system in response to the quantity of data to be synchronized not satisfying the threshold.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION OF THE DRAWINGS

Figure 1:
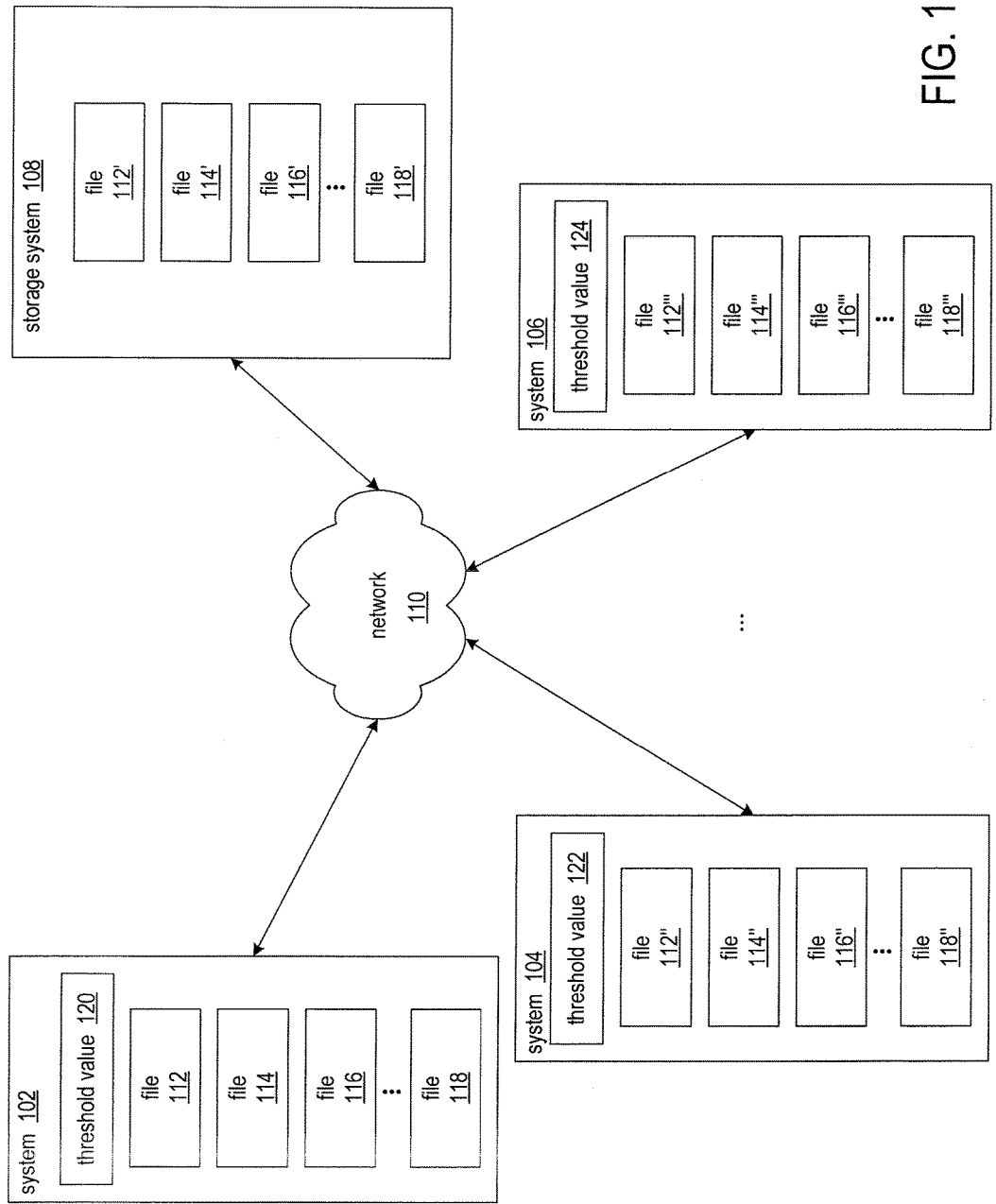
FIG. 1 shows files replicated across multiple systems/devices and a cloud storage system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The wide disparity between the storage capacity of a user's individual devices and the storage available from cloud service providers, distributed file systems or even local network storage may be problematic for users. Though a cloud service provider may supply nearly unlimited storage capacity, a user's local storage is limited to the capacity of each device. When synchronizing files between a storage system and a user's device ("local device") and the available storage on the device is exhausted, some services simply abort the synchronization process, thereby leaving some files unsynchronized.

A user may also be limited by available bandwidth. For example, a user may rely on wireless services in working from a laptop, tablet, or smartphone, and the user may be limited by contract to a certain quantity of data that can be wirelessly transferred over a period of time. In some cases, the data transfer rate may be reduced once a user reaches a data limit. A user's allotment of wireless bandwidth may be unintentionally exhausted by the synchronization process.

The disclosure describes approaches for synchronizing files across multiple data processing systems. The disclosed approaches may be especially suitable for synchronization of files involving cloud storage providers and multiple computing devices used to access and modify those files.

Two or more types of thresholds may be available for selection by a user. Each type of threshold limits the synchronization process in a different way. For example, one type of threshold specifies a total amount of storage space available on a user's device for storage of files eligible for synchronization, and another type of threshold specifies a total quantity of data that may be transferred over a wireless communication channel during synchronization. The type and value of the threshold may be solicited and input from the user, and the threshold value is stored for subsequent use during synchronization.

Files that need to be synchronized between two systems, such as a cloud storage system and a user's local device, may be determined from metadata associated with the versions of the file on the two systems. In an example implementation, the metadata may include timestamps on the two systems, and the timestamps may be compared to determine which files need to be synchronized. Versions of a file having equal timestamps are synchronized, and versions of a file having unequal timestamps are unsynchronized. For example, if the version of the file in cloud storage has a later timestamp than the timestamp of the version on the user's device, the versions of the file are unsynchronized. Each file may have multiple different types of timestamps. For example, one type of timestamp may indicate the time at which the file was last modified (a "last-modified timestamp"), and another type of timestamp may indicate when the file was last accessed (a "last-accessed timestamp"). The last-modified timestamp indicates the time at which the file was last modified such as by writing data to the file. The last-accessed timestamp indicates the time at which the file was either read from or written to.

For the unsynchronized files, the quantity of data to be transmitted and stored in the synchronization is determined. Depending on the application and implementation, the quantity of data to synchronize a file may be that of the entire file or that of only changed portions of the file. If synchronizing the unsynchronized files would not exceed the threshold value, then synchronization of the unsynchronized files proceeds. In one implementation, synchronization may be performed for fewer than all of the unsynchronized files if synchronizing the unsynchronized files would exceed the threshold value. In another implementation, the type of threshold selected by the user may control the synchronization when synchronizing the unsynchronized files would exceed the threshold value.

If synchronizing the unsynchronized files would exceed the user-specified threshold value for the device, then in one approach, synchronization is limited to most-recently updated ones of the unsynchronized files. That is, instead of simply selecting some number of unsynchronized files for which synchronization would not exceed the threshold value, one or more of the unsynchronized files that have been most recently updated are selected for synchronization. A file that has been recently updated may be more likely to be useful on a device than a file that was updated less recently.

In another approach, if the type of threshold selected by the user for a particular device indicates a total quantity of storage available for storage of files, and if synchronizing the unsynchronized files would exceed the user-specified threshold value for the device, then some of the files on the device may be evicted to make room to synchronize the unsynchronized files. The selection of files for eviction may be based on recency of update and the number of files needed to satisfy storage requirements, in addition to the sizes of the files.

FIG. 1 shows files replicated across multiple systems/devices and a cloud storage system. Systems 102, 104, and 106 may include desktop computers, laptop computers, tablets, and smart phones, for example. The storage system 108 may range from a single networked storage server to multiple large scale data processing systems that are configured to provide data storage services for thousands of users who may connect to the service via a network 110, such as the Internet.

A number of files are replicated across the systems/devices 102, 104 and 106 and storage system 108. Each system has a version of one of the replicated files. File 112 is a version of a particular file on system 102, file 112' is a version of the same file on the storage system 108, file 112" is a version of the same file on system 104, and file 112''' is a version of the same file on system 106. Similarly, files 114, 114', 114", and 114''' are versions of the same file; files 116, 116', 116", and 116''' are versions of the same file; and files 118, 118', 118", and 118''' are versions of the same file.

Different ones of the systems/devices 102, 104, and 106 may have different storage capacities and/or different bandwidth constraints, and a user may specify a desired type of threshold and a value for the selected type of threshold on each system. For example, on system 102, the user may specify a storage capacity threshold value 120, and on systems 104 and 106, the user may specify bandwidth threshold values 122 and 124. The bandwidth threshold values 122 and 124 may be the same or different.

Assuming different types and values of the thresholds on the systems 102, 104, and 106, some of the versions of the files on the system 102, 104, and 106 may be unsynchronized with storage system 108. For example, on system 102, files 112, 114, and 116 may be synchronized with the versions 112', 114', and 116' on the storage system, but file 118 may be unsynchronized with version 118' on the storage system due to storage constraints on the system 102. Similarly, on system 104, files 114" and 116" may be synchronized with versions 114' and 116' on the cloud storage system 108, but files 112" and 118" may be unsynchronized with versions 112' and 118' on the storage system due to bandwidth constraints of the system 104.

Software (not shown) executing on the systems 102, 104, 106, and storage system 108 cooperatively synchronizes the files and limits the synchronization according to user-specified threshold values. The software provides a user interface through which the user may be prompted to specify the type and value of a threshold to be used to limit synchronization at a particular system. In one implementation, software executing on each system 102, 104, and 106 may solicit threshold information from the user for that particular system. In another implementation, the storage system 108 may provide a centralized interface that solicits the threshold information for all of the user's systems. The threshold values may be stored locally in memory of the systems 102, 104, and 106, or may be stored centrally in memory of the storage system 108.

Figure 2:
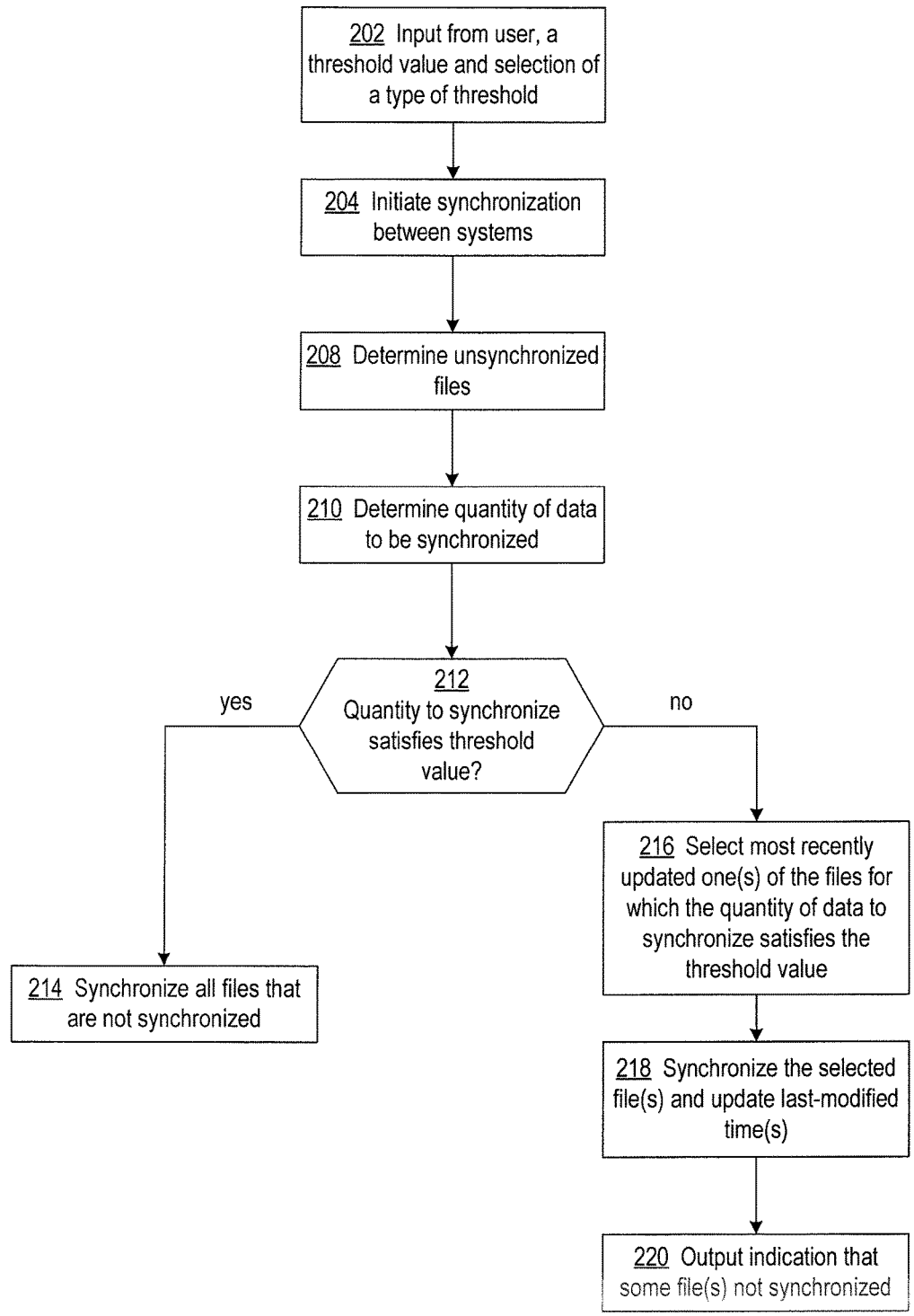
FIG. 2 is a flowchart of a general process for limiting synchronization of files between a user's devices and a cloud storage system.

FIG. 2 is a flowchart of a general process for limiting synchronization of files between a user's devices and a storage system. For ease of exposition, the description is limited to a storage system as one system and a user's local device as another system. It will be appreciated that the teachings are applicable to a user having multiple stationary and/or mobile devices.

At block 202, the user is solicited for specification of a type of threshold and a threshold value for a local system. Some implementations may have only one type of threshold, and specification of a threshold type need not be input by the user. The type and value are input and stored locally on the system or at the storage system in association with an identifier of the system.

At block 204, synchronization of files between the systems is initiated. Events that trigger synchronization may vary by application and implementation. For example, synchronization may be initiated in response to powering-on the local system, the user accessing a file, or the user explicitly invoking a synchronization function.

The file (or files) in need of synchronization are determined at block 208. In one implementation, the local system and storage system maintain databases that include file identifiers and associated timestamps. A difference between the timestamps on the local system and the storage system indicates a file is unsynchronized. The system having the later timestamp has the most recently accessed or most-recently modified version of the file and may be used as the source file to synchronize with a destination file on the system having the earlier timestamp. For some implementations, it may be desirable to postpone synchronization if a version of the file on the local system has a later last-accessed time than the version of the file in the storage system, but the version of the file in the storage system has a later last-modified timestamp than the last-modified timestamp on the local system. The postponement may be an option presented to the user by the local system on a per-file basis, or the local system may provide a user-configurable parameter through which the user can specify whether or not the synchronization should be postponed for all files having later last-accessed timestamps as described above.

At block 210, the quantity of data to be synchronized is determined. Depending on the application and organization of the data in a file, the quantity of data to be synchronized for a file may be the size of the entire file, which may include both changed and unchanged data, or may be only data that differs between the up-to-date and unsynchronized versions of the file.

Decision block 212 determines whether or not the quantity of data to synchronize satisfies the threshold value. For a threshold type for controlling use of bandwidth during synchronization, the quantity of data to synchronize satisfies the threshold value if the quantity of data to synchronize is less than the threshold value. For a threshold type that controls the quantity of storage that may be used for replicating files on the local system, for the quantity of data to synchronize to satisfy the threshold value, the total quantity of storage space occupied by the replicated files after synchronization must be less than the threshold value.

If the quantity of data to synchronize satisfies the threshold value, at block 214, the process synchronizes all the unsynchronized files, as determined at block 208. Otherwise, the process continues at block 216.

At blocks 216 and 218, a subset of the unsynchronized files are selected and synchronized. In one implementation, of the files determined at block 208, the most recently modified ones of the files for which the quantity of data to synchronize satisfies the threshold are selected. In an example scenario, files f1, f2, f3, and f4 are determined to be unsynchronized, and the quantity of data to synchronize f1 is 1 MB, f2 is 2 MB, f3 is 4 MB, and f4 is 8 MB. The total quantity of data to synchronize is 15 MB. Timestamps (e.g., in the form of year-month-day-hour-minute-second, YYYY-MM-DD-HH-MM-SS) associated with the files may be used to determine the most recently modified files. If a bandwidth-type threshold value is 8 MB and file f4 was modified more recently than file f3, file f3 was modified more recently than file f1, and file f1 was modified more recently than file f2, then file f4 may be selected for synchronization, because file f4 was most recently updated and the quantity of data to synchronize file f4 (8 KB) satisfies the bandwidth-type threshold. If the bandwidth-type threshold value was 12 MB, then files f4 and f3 would be selected. If a storage-capacity-type threshold value is used instead of a bandwidth-type threshold value, the selection of files is similar. However, in selecting the most recently modified file(s), the total quantity of storage occupied by all replicated files after synchronizing the selected files must be less than the storage-capacity-type threshold value.

When a bandwidth-type threshold value is used, the synchronizing of the selected files at blocks 214 and 218 may entail accumulating a running total of quantities of data synchronized over multiple synchronization operations. The running total of the quantity of data may be used at decision block 212 to determine whether or not the quantity of data to synchronize satisfies the threshold value. The accumulation may continue over a period of time, and at the end of the time period, the running total may be cleared. For example, a user may be contracted for a wireless data plan that permits up to X GB/month of high-speed wireless data transfers. The user may set the bandwidth-type threshold value to X/2 GB. At the beginning of each month, the running total is reset to 0 GB, and with each synchronization operation the total quantity of data transmitted in that synchronization operation is added to the running total.

Depending on the quantity of data to be transmitted in the initial synchronizations, the process may synchronize all the unsynchronized files as in block 214. When the running total approaches X/2 GB and depending on the quantity of data to be transmitted, some number of the most recently modified ones of the files may be selected for synchronization as in block 216. If at block 216, there are no most recently updated files that would satisfy the bandwidth-type threshold value, then the system may ask the user whether or not the bandwidth-type threshold value should be overridden. If the user elects to override the bandwidth-type threshold value, the system may ask the user to select one or more unsynchronized files to synchronize.

At block 218, the process synchronizes the selected files. Data required to make the versions of the selected files the same on both systems is transmitted to the local device and stored accordingly. In addition, the timestamp(s) on the local device is updated with the timestamp(s) from the storage system. For some implementations, it may be desirable to postpone or bypass synchronization if a version of the file on the local system has a later last-accessed time than the version of the file in the storage system, but the version of the file in the storage system has a later last-modified timestamp than the last-modified timestamp on the local system. The postponement may be an option presented to the user by the local system on a per-file basis, or the local system may provide a user-configurable parameter through which the user can specify whether or not the synchronization should be postponed for all files having later last-accessed timestamps as described above. At block 220, data may be output and displayed to the user to inform the user that some of the files were not synchronized.

Figure 3:
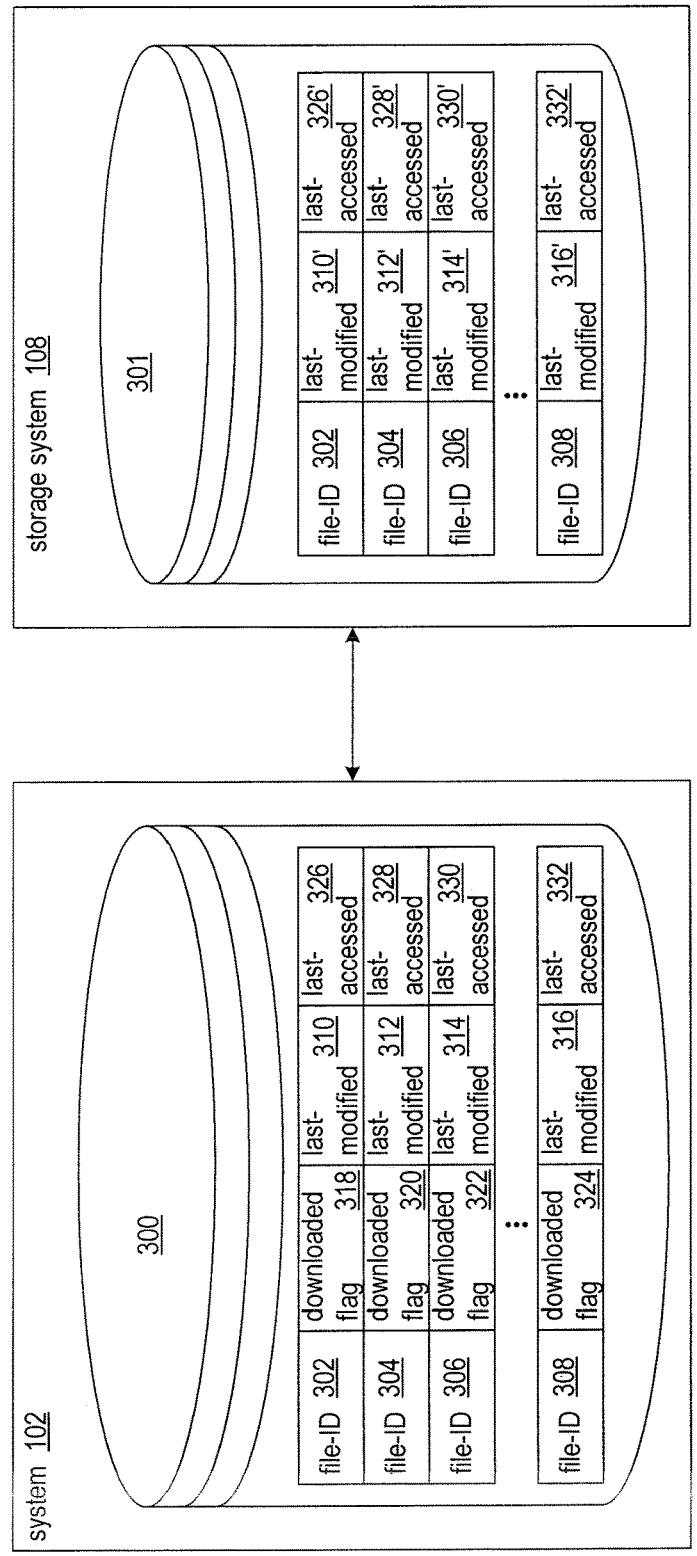
FIG. 3 shows databases on a system/device and the cloud storage system.

FIG. 3 shows databases 300 and 301 on a system/device 102 and the storage system 108. The database 300 on the local system 102 includes data that identifies the files in a storage account, downloaded flags that indicate whether or not versions of the associated files are present on the local system 102, and timestamps of files downloaded to the local system. Database 300 includes file IDs 302, 304, 306, and 308, and respectively associated downloaded flags 318, 320, 322, and 324, last-modified timestamps 310, 312, 314, and 316, and last-accessed timestamps 326, 328, 330, and 332.

The database 301 in the storage system 108 includes file identifiers 302, 304, 306 and 308 and associated last-modified timestamps 310', 312', 314' and 316' and associated last-accessed timestamps 326', 328', 330', and 332' of the files in the storage system. The files replicated between the local system 102 and the storage system 108 have the same file IDs in the databases. The timestamps associated with a file-ID on the two systems may differ depending on whether the file is synchronized or unsynchronized between the two systems and depending on when the files were last accessed. For example, the last-modified timestamp 310 for file ID 302 would be equal to the last-modified timestamp 310' if the versions of the file identified by file ID 302 are synchronized. The timestamp 312 for file ID 304 would not be equal to the timestamp 312' if the versions of the file identified by file ID 304 are not synchronized.

Figure 4:
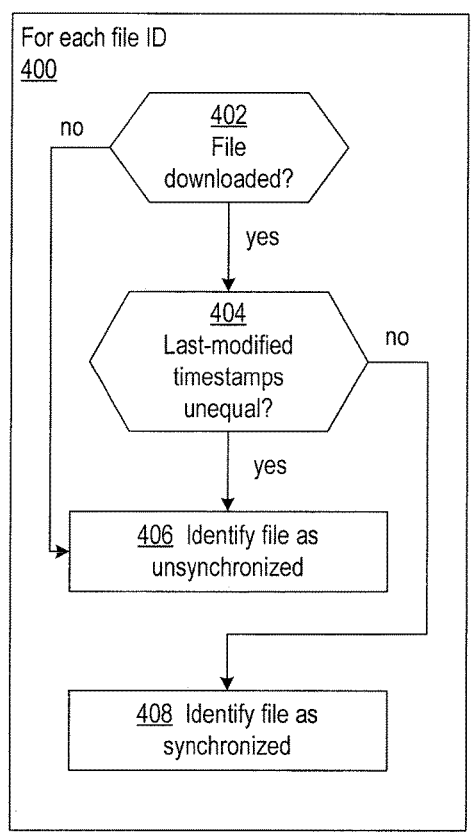
FIG. 4 is a flowchart of a process of determining files that are unsynchronized based on the timestamps in the local and cloud databases.

FIG. 4 is a flowchart of a process of determining files that are unsynchronized based on the last-modified timestamps in the local and storage system databases. The process of block 400 may be performed for each file ID in the local database, such as database 300 in system 102 as shown in FIG. 3. At decision block 402, the process tests the downloaded flag associated with the in-process file ID. If the referenced file has already been downloaded to the local system, the process proceeds to decision block 404, where the last modified timestamps associated with the file ID on the local system and storage system are compared. If the last-modified timestamps are not equal, the file referenced by the file ID is identified as unsynchronized at block 406. Otherwise, the file is identified as synchronized at block 408. If the file identified by the file ID has not been downloaded, decision block 402 directs the process to block 406, where the file is identified as unsynchronized.

Figure 5:
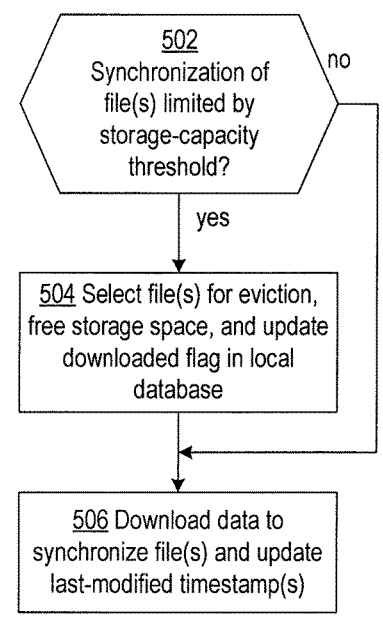
FIG. 5 shows processing performed if the local system has insufficient storage for the synchronization of the files.

FIG. 5 shows processing performed if the local system has insufficient storage for the synchronization of the files. The process of FIG. 5 may be performed as an alternative to the processing of blocks 216 and 218 of FIG. 2 and may be applicable when the user selects a storage-capacity-type threshold value. In general, the process of FIG. 5 selects files to evict from the local system when the storage-capacity-type threshold value has been reached and there are files to be synchronized.

If the synchronization of unsynchronized files is limited by a storage-capacity-type threshold value, decision block 502 directs the process to block 504. At block 504, one or more files stored on the local system are selected for eviction in order to make storage space available for synchronizing the unsynchronized files. In one implementation, least recently used ones of the files may be selected for eviction. In one implementation, the last-modified timestamps associated with the files may be used in one implementation to determine the least recently used. In another implementation, the last-accessed timestamp may be associated with each file to indicate a read access to the file and used to determine the least recently used files.

A variation on using least recently used criteria to select files for eviction may be to consider the recency of use along with the number of files for which eviction would be required to satisfy the storage requirements for the files to be synchronized. It may be desirable to compromise on the least recently used criteria in order to evict fewer files, leaving a greater number of files on the local device. For example, if the least recently used files in order from least recently used to more recently used are 1 KB, 2 KB, 3 KB, 4 KB, 8 KB and 10 KB, and 10 KB of storage is required for synchronizing, the 2 KB and 8 KB files could be evicted to free 10 KB of storage rather than evicting the 1 KB, 2 KB, 3 KB, 4 KB files.

Once one or more files are selected for eviction, at block 504 storage space allocated to the one or more files is de-allocated, and the downloaded flag in the local data is updated for each file to indicate that a version of the file is not present on the local device. At block 506, data from the file(s) to be synchronized is downloaded from the storage system to the local device, and the timestamp(s) is updated with the value from the storage system.

Figure 6:
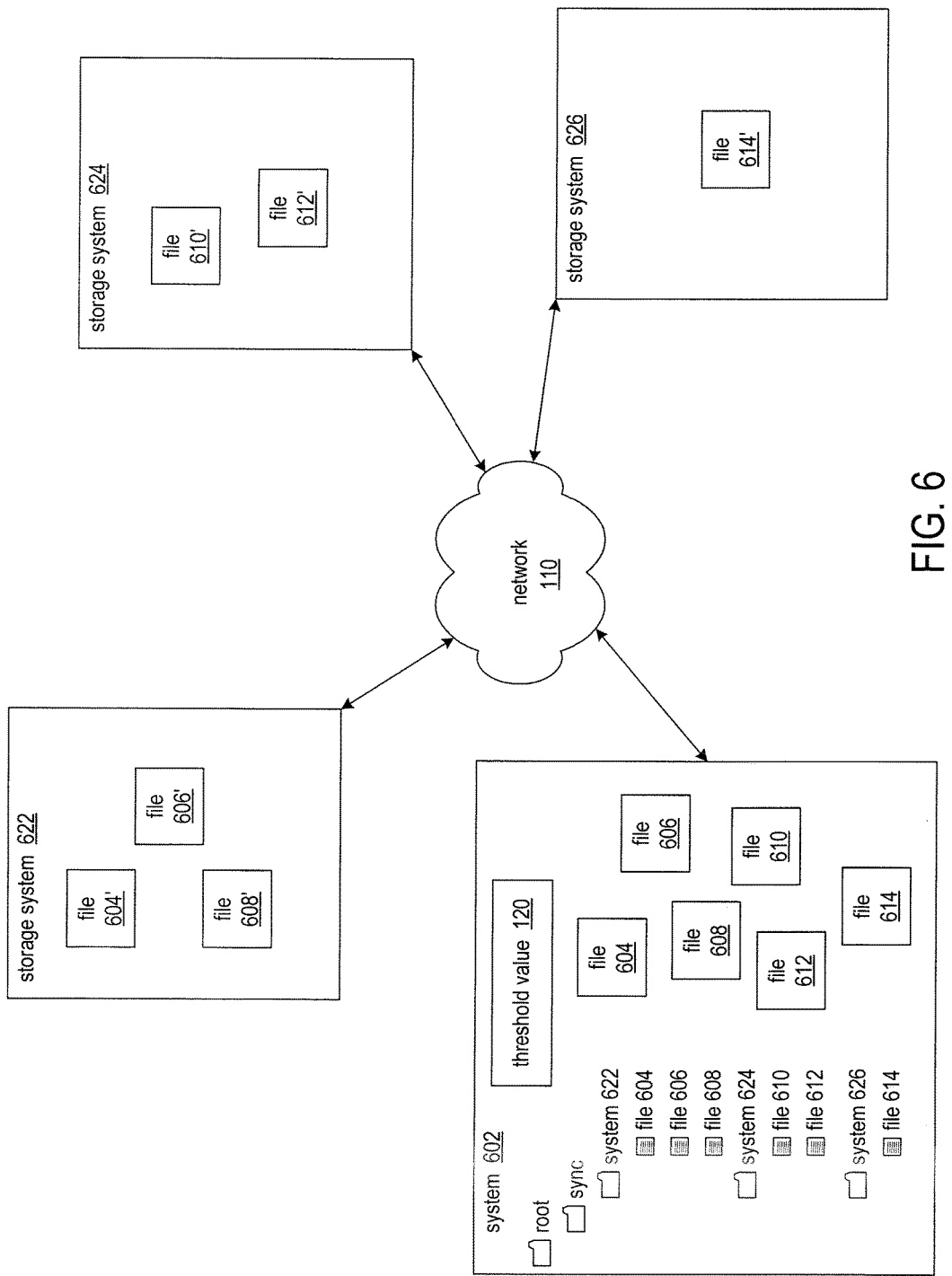
FIG. 6 shows synchronization of files between a local system/device and multiple cloud storage systems.

FIG. 6 shows synchronization of files between a local system/device 602 and multiple storage systems 622, 624, and 626. Some users may elect to use the services of multiple storage providers and have different providers store different sets of files. Synchronization is limited between the local device and the storage systems according to the configured threshold value 120.

A hierarchy of files is shown on system 602. The hierarchy includes a "root" directory and a "sync" subdirectory. The sync subdirectory has respective subdirectories for the storage systems 622, 624, and 626. The file icons under the directory icon for each storage system indicate the files that are replicated between that storage system and the local device. For example, versions 604', 606', and 608' of files 604, 606, and 608 are stored on storage system 622, versions 610' and 612' of files 610 and 612 are stored on storage system 624, and a version 614' of file 614 is stored on storage system 626.

Rather than having multiple user interfaces for synchronizing between the local system 102 and the multiple storage systems 622, 624, and 626 of multiple storage providers, a single user interface may be provided to execute on the local system and interface with the different storage systems to synchronize data. The single user interface may enforce capacity and bandwidth thresholds, as described above, across all the storage systems. In addition, the single user interface may provide an encryption option through which the user may encrypt the synchronized files.

Figure 7:
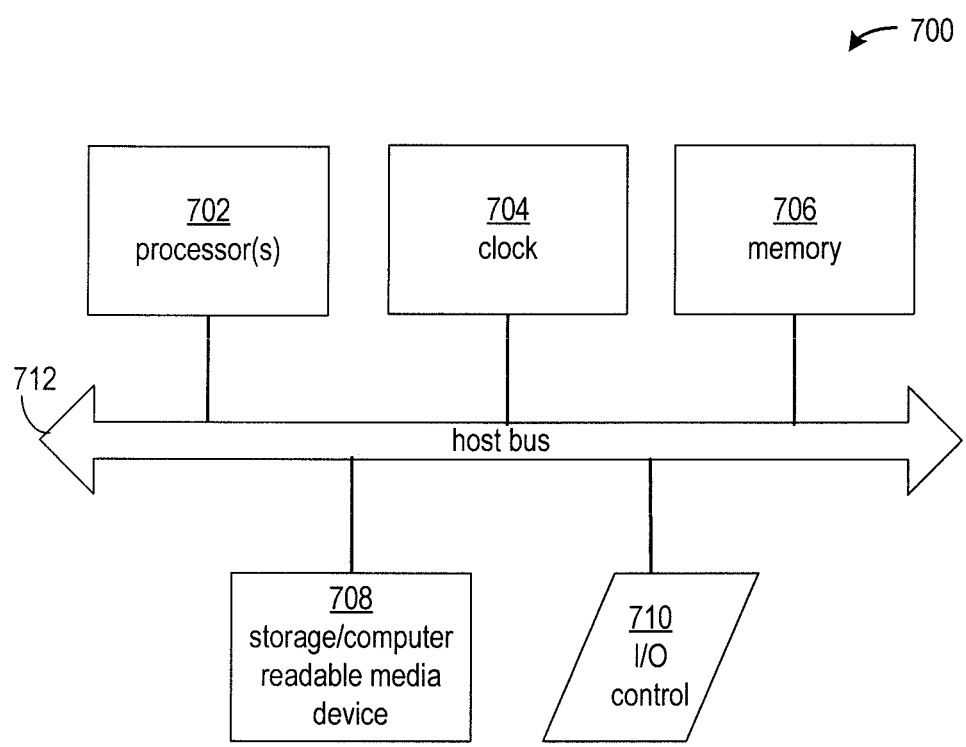
FIG. 7 is a block diagram of an example computing arrangement on which the processes described herein may be implemented.

FIG. 7 is a block diagram of an example computing arrangement on which the processes described herein may be implemented. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/output control arrangement 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for securing shared data. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of synchronizing replicated files across a plurality of systems, comprising:
   on a programmed processor of one of the systems, performing operations including:
      inputting a user-specified value of a threshold indicative of a quantity of data;
      storing the value of the threshold in processor-readable memory on the one system;
      determining a set of files of the replicated files that are unsynchronized between the one system and another system of the plurality of systems;
      determining a quantity of data to be synchronized for the set of files;
      synchronizing all the files of the set of files between the one system and the other system in response to the quantity of data to be synchronized satisfying the value of the threshold;
      selecting from the set of files, in response to the quantity of data to be synchronized not satisfying the threshold, one or more files for which the quantity of data to be synchronized does not exceed the value of the threshold; and
      synchronizing only the one or more files between the one system and the other system in response to the quantity of data to be synchronized not satisfying the threshold.

2. The method of claim 1, wherein the value of the threshold indicates an amount of space available on the one system for storage of the replicated files, and the selecting includes:
   selecting from the set of files the one or more files for which synchronization would not cause a total storage space of the one or more files and other files of the replicated files to exceed the value of the threshold.

3. The method of claim 1, wherein the value of the threshold specifies a limit of a quantity of data to be transferred over a wireless communication channel.

4. The method of claim 3, wherein the selecting includes:
   selecting the one or more of the files that have a total quantity of data to be synchronized that satisfies the value of the threshold.

5. The method of claim 1, wherein the determining files that are unsynchronized includes:
   comparing a timestamp associated with a file on the one system to a timestamp associated with the file on the other system;
   determining the file to be unsynchronized in response to the timestamp associated with the file on the one system being earlier than the timestamp associated with the file on the other system.

6. The method of claim 5, wherein the synchronizing all of the files and the synchronizing only the one or more files include for each file in the set of files that are unsynchronized, updating each timestamp associated with the file on the one system, with a timestamp associated with the file on the other system.

7. The method of claim 1, further comprising:
   soliciting from a user a value of one of at least two user-selectable types of thresholds; and
   inputting the value of one of the types of thresholds in response to user specification of the value and selection of the one of the types.

8. The method of claim 7, wherein:
   a first type of the at least two types of thresholds indicates an amount of space available on the one system for storage of the replicated files; and
   a second type of the at least two types of thresholds indicates a limit of a quantity of data to be transferred over a wireless communication channel.

9. The method of claim 1, wherein:
   the determining the set of files to be synchronized includes determining respective subsets of one or more files of the set of files to be synchronized between the one system and others of the plurality of systems;
   the determining the quantity of data of the set of files to be synchronized includes determining a total quantity of data to be synchronized in the respective subsets of files;
   the synchronizing all the files of the set of files includes synchronizing all the files of the respective subsets between the one system and the others of the plurality of systems in response to the total quantity of data satisfying the value of the threshold; and
   the synchronizing only the one or more files includes synchronizing only the one or more files between the one system and the other systems of the plurality of systems in response to the total quantity of data of the files to be synchronized not satisfying the value of the threshold.

10. The method of claim 1, further comprising bypassing synchronization of a file of the set of files in response to a last-accessed timestamp of the file on the one system being later than a last-accessed timestamp of the file on the other system and a last-modified timestamp of the file on the other system being later than a last-modified timestamp of the file on the one system.

11. A method of synchronizing replicated files across a plurality of systems, comprising:
on a programmed processor of one of the systems, performing operations including:
soliciting from a user a value of a threshold;
inputting the value of the threshold in response to user specification of the value, wherein the value of the threshold indicates an amount of space available on the one system for storage of the replicated files;
storing the value of the threshold in processor-readable memory on the one system;
determining a first set of files of the replicated files that are unsynchronized and a second set of files of the replicated files that are synchronized between the one system and another system of the plurality of systems;
determining first and second quantities of data of the first and second sets of files, respectively;
selecting on the one system, in response to a sum of the first and second quantities of data being greater than the threshold value, one or more files of the second set having a quantity of data that is greater than or equal to the first quantity of data;
de-allocating storage on the one system from the one or more files; and
synchronizing the first set of files between the one system and the other system.

12. The method of claim 11, wherein the determining files that are unsynchronized includes:
comparing a timestamp associated with a file on the one system to a timestamp associated with the file on the other system; and
determining the file to be unsynchronized in response to the timestamp associated with the file on the one system being earlier than the timestamp associated with the file on the other system.

13. The method of claim 12, wherein the synchronizing includes for each file in the set of files that are unsynchronized, updating each timestamp associated with the file on the one system, with a timestamp associated with the file on the other system.

14. A system for synchronization of replicated files, comprising:
a memory arrangement configured with a plurality of files that are replicated on another system;
a computer processor coupled to the memory arrangement, wherein the memory arrangement is configured with instructions that when executed by the computer processor cause the computer processor to:
input a user-specified value of a threshold indicative of a quantity of data;
store the value of the threshold in the memory arrangement;
determine a set of files of the replicated files that are unsynchronized between the memory arrangement and the other system;
determine a quantity of data to be synchronized for the set of files;
synchronize all the files of the set of files between the memory arrangement and the other system in response to the quantity of data to be synchronized satisfying the value of the threshold;
select from the set of files, in response to the quantity of data to be synchronized not satisfying the threshold, one or more files for which the quantity of data to be synchronized does not exceed the value of the threshold; and
synchronize only the one or more files between the memory arrangement and the other system in response to the quantity of data to be synchronized not satisfying the threshold.

15. The system of claim 14, wherein the value of the threshold indicates an amount of space available on the memory arrangement for storage of the replicated files, and the instructions for selecting include instructions that cause the processor to:
select from the set of files one or more files for which synchronization would not cause a total storage space of the one or more files and other files of the replicated files to exceed the value of the threshold.

16. The system of claim 14, wherein the value of the threshold specifies a limit of a quantity of data to be transferred over a wireless communication channel.

17. The system of claim 16, wherein the instructions for selecting include instructions that cause the computer processor to:
select the one or more of the files that have a total quantity of data to be synchronized that satisfies the value of the threshold.

18. The system of claim 14, wherein the memory arrangement is further configured with instructions that when executed by the computer processor cause the computer processor to bypass synchronization of a file of the set of files in response to a last-accessed timestamp of the file in the memory arrangement being later than a last-accessed timestamp of the file on the other system and a last-modified timestamp of the file on the other system being later than a last-modified timestamp of the file in the memory arrangement.

19. The system of claim 14, wherein the memory arrangement is further configured with instructions that when executed by the computer processor cause the computer processor to:
solicit from a user a value of one of at least two user-selectable types of thresholds, wherein a first type of the at least two types of thresholds indicates an amount of space available on the one system for storage of the replicated files, and a second type of the at least two types of thresholds indicates a limit of a quantity of data to be transferred over a wireless communication channel; and
input the value of one of the types of thresholds in response to user specification of the value and selection of the one of the types.

* * * * *